US007441602B2

(12) United States Patent
Saint-Marcoux

(10) Patent No.: US 7,441,602 B2
(45) Date of Patent: Oct. 28, 2008

(54) FLOWLINE INSULATION SYSTEM

(75) Inventor: Jean-Francois Saint-Marcoux, Paris (FR)

(73) Assignee: Acergy France S.A., Suresnes (FR)

( * ) Notice: Subject to any disclaimer, the term of this patent is extended or adjusted under 35 U.S.C. 154(b) by 370 days.

(21) Appl. No.: 10/516,199

(22) PCT Filed: May 28, 2003

(86) PCT No.: PCT/EP03/06458

§ 371 (c)(1),
(2), (4) Date: Jun. 27, 2005

(87) PCT Pub. No.: WO03/102357

PCT Pub. Date: Dec. 11, 2003

(65) Prior Publication Data

US 2005/0232703 A1      Oct. 20, 2005

(30) Foreign Application Priority Data

May 31, 2002    (GB) .................................. 0212689.4

(51) Int. Cl.
*E21B 36/00* (2006.01)
(52) U.S. Cl. ................... 166/302; 138/148; 138/149
(58) Field of Classification Search ............... 166/61, 166/367, 350, 272.1, 302; 138/148, 149, 138/114
See application file for complete search history.

(56) References Cited

U.S. PATENT DOCUMENTS

| 4,116,275 | A | * | 9/1978 | Butler et al. ................. 166/303 |
| 4,276,936 | A | * | 7/1981 | McKinzie .................... 166/303 |
| 4,296,814 | A | * | 10/1981 | Stalder et al. ................ 166/303 |
| 4,718,459 | A | * | 1/1988 | Adorjan ....................... 405/172 |
| H000594 | H | * | 3/1989 | Adorjan ....................... 138/148 |
| 4,896,725 | A | * | 1/1990 | Parker et al. ................. 166/267 |
| 5,046,896 | A | * | 9/1991 | Cole .......................... 405/195.1 |
| 5,535,825 | A | * | 7/1996 | Hickerson .................... 166/302 |
| 5,979,506 | A | * | 11/1999 | Aarseth ........................ 138/33 |
| 6,082,391 | A | * | 7/2000 | Thiebaud et al. ......... 137/236.1 |
| 6,264,401 | B1 | * | 7/2001 | Langner et al. ............. 405/169 |
| 6,321,844 | B1 | * | 11/2001 | Thiebaud et al. ............ 166/345 |
| 6,536,526 | B2 | * | 3/2003 | Cox ............................ 166/302 |
| 6,926,040 | B1 | * | 8/2005 | Prescott et al. .............. 138/148 |
| 6,955,221 | B2 | * | 10/2005 | Bursaux ...................... 166/303 |

(Continued)

FOREIGN PATENT DOCUMENTS

EP              744576 A2 *   11/1996

(Continued)

OTHER PUBLICATIONS

Britannica Online Encyclopedia (www.britannica.com), "Gas", pp. 1-18, no date.

*Primary Examiner*—Thomas A Beach
*Assistant Examiner*—Matthew R Buck
(74) *Attorney, Agent, or Firm*—Browning Bushman P.C.

(57) ABSTRACT

A method of controlling the heat transfer properties of a sub-sea conduit having inner and outer walls (800, 802) and a gas-permeable space (804) between the walls providing thermal insulation, the method comprising varying the pressure of a gas within the space between values above and below a critical pressure range at which thermal conductivity of the gas exhibits a high rate of change.

12 Claims, 7 Drawing Sheets

U.S. PATENT DOCUMENTS

| | | | |
|---|---|---|---|
| 7,104,330 B2 * | 9/2006 | Legras et al. | 166/367 |
| 2002/0139533 A1 * | 10/2002 | Cox | 166/302 |
| 2004/0076478 A1 * | 4/2004 | Legras et al. | 405/224.2 |

FOREIGN PATENT DOCUMENTS

| | | |
|---|---|---|
| FR | 2746891 | 10/1997 |
| GB | 2346188 | 8/2000 |
| GB | 2351301 | 12/2000 |
| WO | WO0114687 | 3/2001 |
| WO | WO02053869 | 7/2002 |

* cited by examiner

FLOWLINE INSULATION SYSTEM

The invention relates to insulation systems for sub-sea hydrocarbon flowlines, and in particular to systems for controlling the overall heat transfer coefficient (OHTC) of conduits insulated by pipe-in-pipe construction.

Insulated flowlines are commonly used to maintain flow in warm hydrocarbon fluids produced from sub-sea wells. Without insulation, the fluids would cool rapidly to sea temperature and normally would solidify in the flowlines, with disastrous results. A particular type of insulation is the "pipe-in-pipe" or double walled structure.

The pipe-in-pipe flowline may be arranged horizontally on the seabed, but the invention will be described particularly in the context of a riser or riser tower of the type described in U.S. Pat. No. 6,082,391 [Stolt-Doris], or in our co-pending international application WO 02/53869A [63752WO], not published at the present priority date. The pipe-in-pipe flowline may be formed generally as described in French Patent FR 2746891 (assigned to ITP) and other patents of ITP. The pipe-in-pipe flowline may be formed using special bulkhead units, as described in application WO 03/085312A [64054WO], also not published at the present priority date. The pipe-in-pipe flowline may incorporate active heating. as described in application US-2004-0040716-A1, corresponding to US Prov 60/385,243 [63981 US] filed on the present priority date. The contents of all these applications are incorporated herein by reference.

It may be desirable under particular circumstances to control the Overall Heat Transfer Coefficient (OHTC) of a Pipe-in-Pipe system. This may be due to the fact that, during a pan of the field life, the well stream temperature may be higher.

In this case it is interesting to modify the OHTC by acting on the pressure of the gas contained in the annulus of the Pipe-in-Pipe. ITP have proposed de-pressurising the annulus of a Pipe-in-Pipe from atmospheric pressure to partial vacuum (about 10 mbar) in order to reduce the conductivity of a microporous material from (for example) 0.02 $W/m^2.K$ to 0.007 $W/m^2.K$.

When applied to an Hybrid Riser Tower, the ITP proposed system would require to pull a vacuum from the buoyancy t located at about 50 m below sea-level. Even-though this scheme is, in theory, feasible, it is elaborate, and susceptible to catastrophic failure leading to the loss of the insulation of the riser, should water find its way into the annulus.

Gases, above their critical temperature, have, for a given temperature, a significantly larger conductivity when maintained above their critical pressure, than below. This phenomenon is described, for example, in Eckert, E.R.G., "Analysis of Heat and Mass Transfer", McGraw-Hill, 1972, p. 770. See in particular Fig B-6: The thermal conductivity k of water and water vapour as a function of pressure and temperature. Referring also to Reid et al, "Properties of Gases and Liquids", McGraw-Hill, 1987, this states on p. 518 "Increasing pressure raises the thermal conductivity, with the region around the critical pressure being particularly sensitive". On p. 519 there is FIG. 10-4: "Thermal conductivity of propane", and it is stated that the curves shown are similar in form to those of water vapour, for example. The latter book also includes a table of relevant data for several hundred gases.

The invention provides a method of controlling the heat transfer properties of a sub-sea conduit having inner and outer walls and a gas-permeable space between the walls providing thermal insulation, the method comprising varying the pressure of gas within the space between values above and below a critical pressure range at which thermal conductivity of the gas exhibits a high rate of change.

The proposed method is to pressurise the annulus above the critical pressure, and then to release the pressure to achieve a lower conductivity. The control thus achieved is a step change between two values of conductivity. the pressure change can be made in the reverse direction, and repeated if necessary for the application.

The conduit may form part of a riser for carrying flowlines from the seabed to a surface installation. The conduit may terminate at a submerged buoyant support, as in a hybrid tower riser. A port for passage of said gas may be provided at the location of the submerged buoyant support. One or more valves may be used for controlling the flow of said gas from the space.

In a preferred embodiment the pressure within the space remains equal to or greater than the ambient pressure at the port.

The valve may be adapted for operation by remotely operated vehicle (ROV), for example.

A gas inlet connection may be provided for use in increasing the gas pressure. One-way check valves may be provided for preventing unintentional ingress of seawater in the event of pressure loss.

One proposed system is to start from a pressure which is higher than the critical pressure. For many gases such as carbon dioxide or nitrogen, the critical pressure is between 30 and 50 bars. This pressure is higher that the seawater pressure at the access point at the top of the Hybrid Riser Tower.

The invention further provides a fabricated pipe-in-pipe flowline adapted for use in the method according to the invention as set forth above.

The invention fiber provides a flowline installation including a submerged pipe-in-pipe flowline having an insulating space filled with gas at a pressure above its critical pressure, and further comprising at least one port for the release of said gas to a pressure below said critical pressure.

Further features and advantages of the invention will be apparent from the following description of examples.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
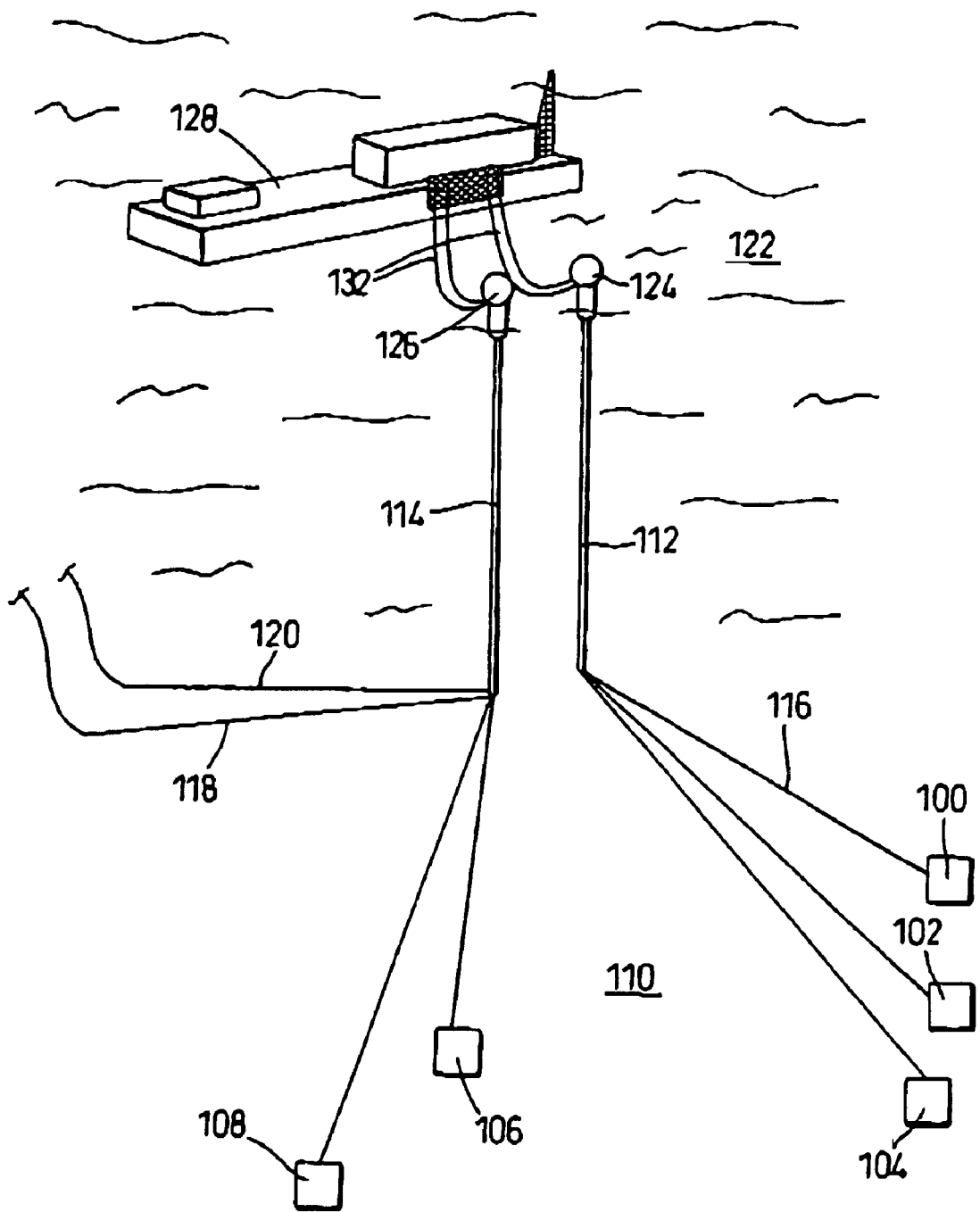
FIG. 1 illustrates schematically a deepwater installation including a floating production and storage vessel and rigid pipeline riser bundles in a deepwater oil field.

Referring to FIG. 1, the person skilled in the art will recognise a cut-away view of a seabed installation comprising a number of well heads, manifolds and other pipeline equipment 100 to 108. These are located in an oil field on the seabed 110.

Vertical riser towers constructed according to the present invention are provided at 112 and 114, for conveying production fluids to the surface, and for conveying lifting gas, injection water and treatment chemicals such as methanol from the surface to the seabed. The foot of each riser, 112, 114, is connected to a number of well heads/injection sites 100 to 108 by horizontal pipelines 116 etc.

Further pipelines 118, 120 may link to other well sites at a remote part of the seabed. At the sea surface 122, the top of each riser tower is supported by a buoy 124, 126. These towers arm pre-fabricated at shore facilities, towed to their operating location and then installed to the seabed with anchors at the bottom and buoyancy at the top.

A floating production and Storage vessel (FPSO) 128 is moored by means not shown, or otherwise held in place at the surface. FPSO 128 provides production facilities, storage and accommodation for the wells 100 to 108. FPSO 128 is connected to the risers by flexible flow lines 132 etc., for the transfer of fluids between the FPSO and the seabed, via risers 112 and 114.

As mentioned above, individual pipelines may be required not only for hydrocarbons produced from the seabed wells, but also for various auxiliary fluids, which assist in the production and/or maintenance of the seabed installation. For the sake of convenience, a number of pipelines carrying either the same or a number of different types of fluid are grouped in "bundles", and the risers 112, and 114 in this embodiment comprise bundles of conduits for production fluids, lifting gas, injection water, and treatment chemicals, methanol.

As is well known, efficient thermal insulation is required around the horizontal and vertical flowlines, to prevent the hot production fluids overly cooling, thickening and even solidifying before they are recovered to the surface. It is also the case that the insulation properties the flowlines and the bundle must be specifically designed to suit the temperature, pressure and chemical composition of the fluids being conveyed, which vary from field to field. In some cases, the temperature may vary widely between reservoirs in the same field, such that a single set of insulation parameters cannot be designed that will suit all the desired operating conditions. Where a fluid is very hot, some hot loss is positively required, to avoid damage, danger, and/or handling difficulties when the fluid reaches the flexible jumpers and the surface vessel.

Figure 2:
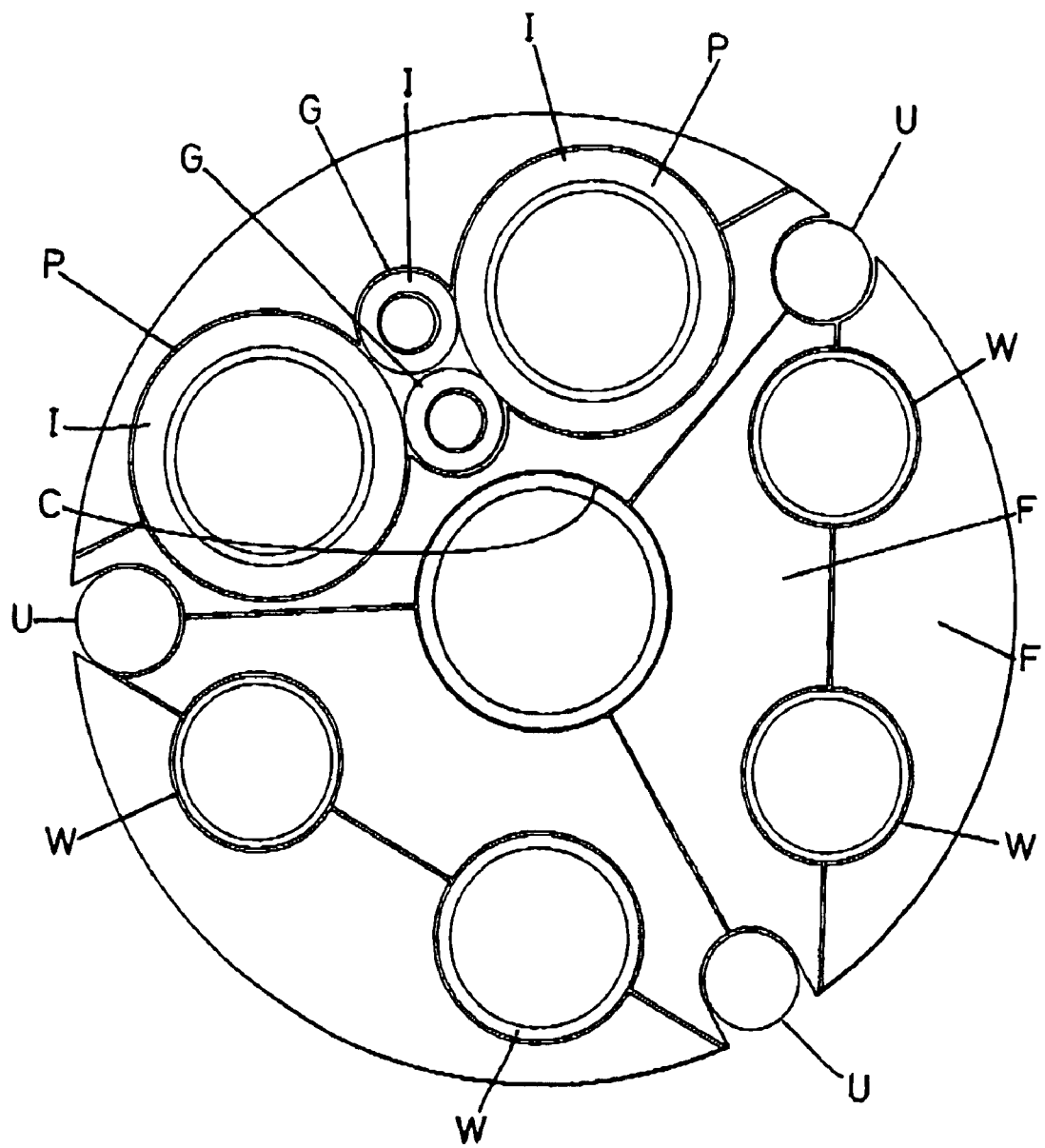
FIG. 2 is a cross-sectional view of a riser bundle suitable for use in the installation of FIG. 1.

FIG. 2 shows in cross-section one of the riser towers 112 or 114. The central metallic core pipe is designated C, and is empty, being provided for structural purposes only. If sealed and filled with air, it also provides buoyancy. Arrayed around the core are production flowlines P, gas lift lines G, water injection lines W and umbilicals U.

The various lines P, G, W, and U are held in a fixed arrangement about the core. In the illustrated example, the lines are spaced and insulated from one another by shaped blocks F of syntactic foam or the like, which also provides buoyancy to the structure.

Flowlines P and gas lift lines G in this example are housed within insulation 1. This may be a solid coating of polypropylene (PP) or the like, but in at least one of the flowlines, a "pipe-in-pipe" insulation has been adopted, to give high insulation, and moreover controllable insulation, in the manner described in the introduction. As described in our co-pending international application WO 02/53869A [63752 WO], additional insulation may be provided, the flowlines may be located within a core pipe, and other variations are possible, which will not be detailed herein.

Of course the specific combinations and types of conduit are presented by way of example only, and the actual provisions will be determined by the operational requirements of each installation The skilled reader will readily appreciate how the design of the installation at top and bottom of the riser tower can be adapted from the prior art including U.S. Pat. No. 6,082,391, mentioned above, and these are not discussed in further detail herein, except where they are modified to control the annular gas pressure, as further described below. Monitoring of the central temperature and pressure can be easily provided by embedding a Bragg effect optic fibre.

As will be appreciated by those skilled in the an the functional specification of the tower will generally require one or two sets of lines, and may typically include within each set of lines twin production flowlines to allow pigging and an injection line. A single water injection line may be sufficient, or more than one may be provide.

Figure 3:
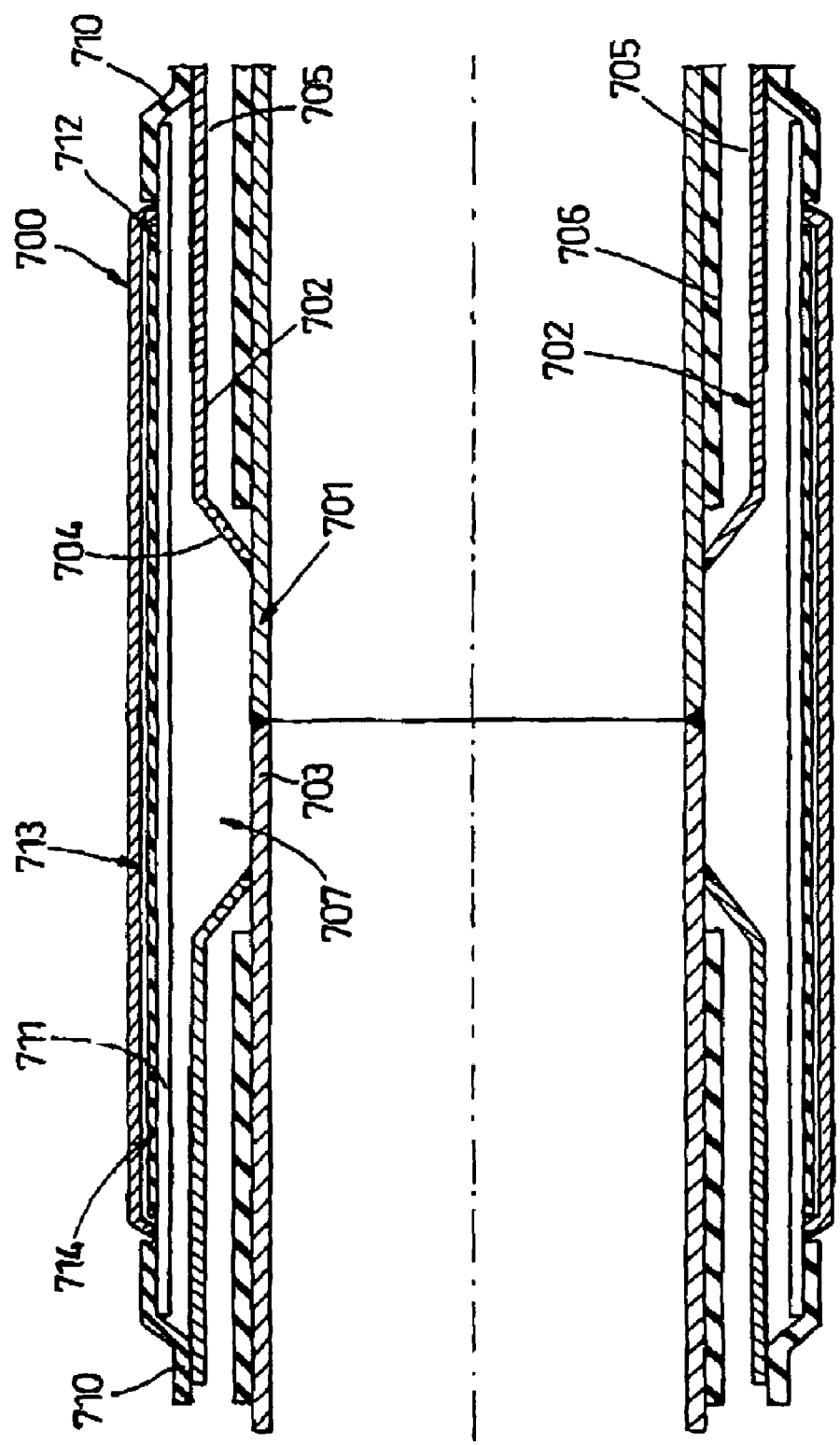
FIG. 3 is a partial longitudinal cross-section of an insulated pipe-in-pipe flowline in the riser bundle of FIG. 1.
Figure 7:
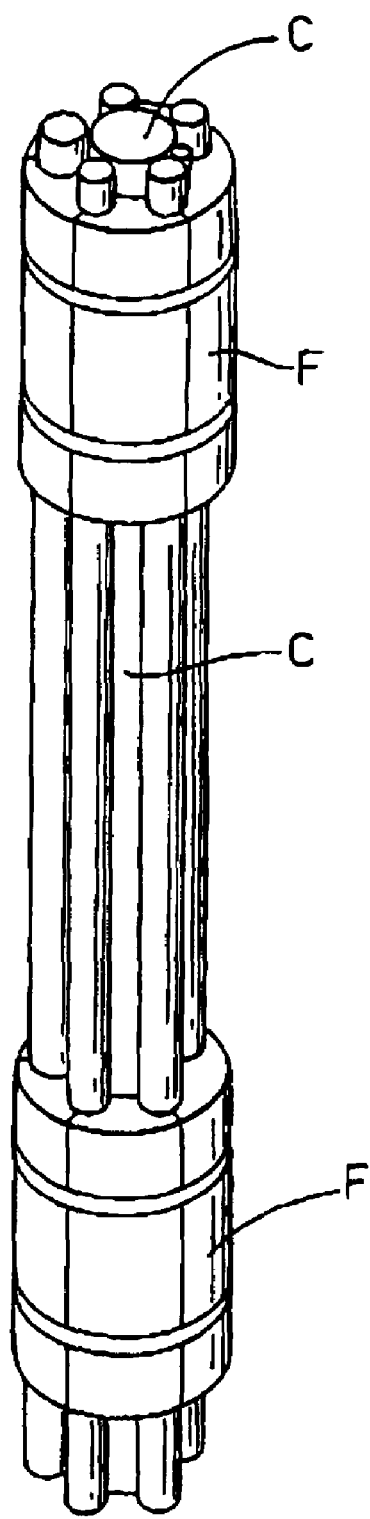
FIG. 7 illustrates a modification of the tower of any of the above examples, in which the foam blocks extend only over parts of the tower's length.

FIG. 3 of the drawings shows in more detail a first alternative construction of the "pipe in pipe" insulated flowline suitable for use within the riser described above as well as in other similar types of applications, this construction for the flowline can be described as arrangement, known per se in the art. This arrangement is generally provided in prefabricated sections 700 for fitting, for example welding, together and FIG. 7 shows in longitudinal cross-section the joint between two such sections, which naturally extend to left and right of the picture.

Each section comprises a central pipe 701 for the transport of fluids such as production fluids and a second pipe 702 in which the pipe 701 is housed for the major part of its length. Ends 703 of the pipe 701 extend beyond the second pipe 702 and enable the sections 700 of the pipe 701 to be secured together in end to end relationship so as to form a pipeline. The second pipe 702 is bent down at its ends 704 to be welded to the outside of the pipe 701 near to the ends 703 and so defines a space 705 between the two pipes. This space 705 provides and or houses the insulation for the pipeline.

In one embodiment a layer 706 of an insulating material, may be provided over the outer surface of the pipe 701 within the space 705. The insulating material may be a microporous material, for example ISOFLEX (a Trade Mark of Microtherm) which is a ceramic like material. With this type of arrangement a gap will still be present between the layer 706 and the inner surface of the pipe 702.

In order to protect and insulate the area around the join in the flowline, it is encased and fixed within a joint 700. The joint 700 comprises a sleeve 711 having an outer surrounding sleeve 712 which as with the section defines a space 714 in which insulating material is located, for example a layer 714 of ISOFLEX as shown in FIG. 7, or polyurethane foam, and two heat shrink end collars 710. The sleeve arrangement 711, 712 and the heat shrink collars 710 are located about one of the sections prior to welding of two sections. When welding is complete the component are slid into place about the join in the pipe. An epoxy resin material is injected into the space 707 defined between the sleeve arrangement and the flowline to fill that space. The beat shrink collars 710 are then heated so that they shrink and seal the sleeve arrangement to the flowline.

The spaces 705 and 707 would conventionally be filled with air or other gas. The pressure in this space would be normal atmospheric, or a partial vacuum may be created so as to reduce convective heat losses. In the present example, however the pressure of the gas is maintained above ambient sea pressure at all times, and is varied either side of the "critical pressure" at which the thermal conductivity k of the gas varies markedly. Ports (not shown) are provided through the joints, to allow control of the gas pressure in the space 205 throughout the structure, and so to control the heat transfer coefficient OHTC of the flowline according to prevailing operation conditions.

Figure 4:
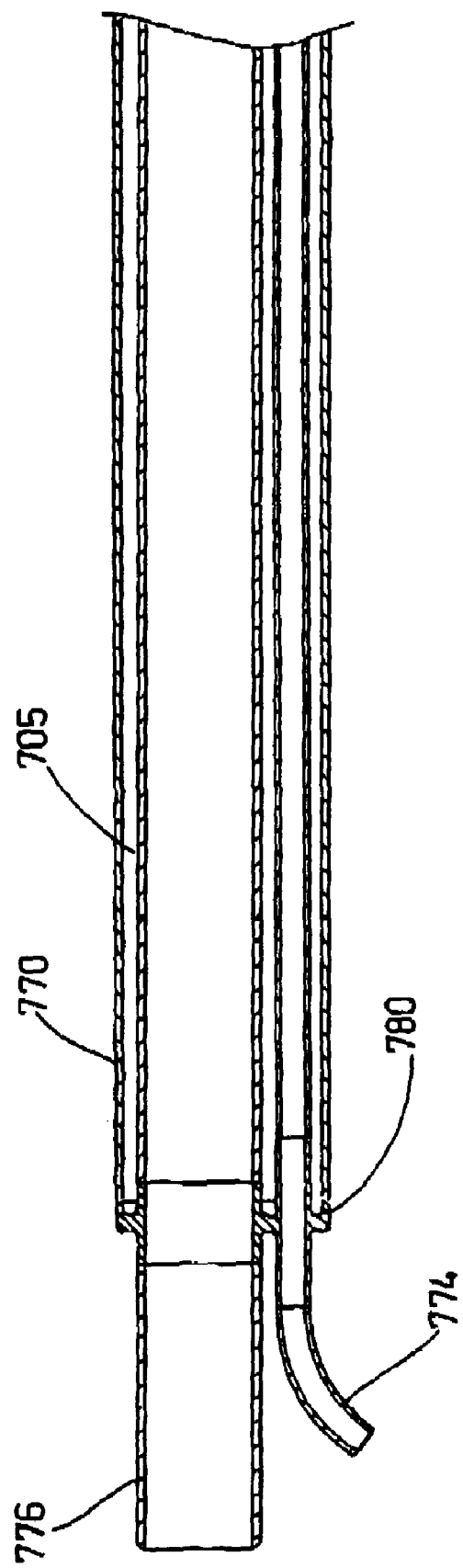
FIG. 4 is a longitudinal cross-section of a pipe-in-pipe flowline according to an alternative construction based on pre-fabricated bulkhead assemblies in the manner of PCT/EP 03/04178 [64054 WO], mentioned above.

FIG. 4 shows the upper end of a second alternative construction of pipe-in-pipe flowline, which includes a main flowline 776 and an auxiliary pipe 774 within outer casing 770. As described in our co-pending application PCT/EP 03/04178 [64054WO], mentioned above, this structure can be assembled from pipe initiation segments on either side of the a special bulkhead 780. After applying initiation segments to the bulkhead units, a long insulated flowline can be welded from sections by conventional orbital welding, unlike the more conventional pipe-in-pipe structure of FIG. 3. Gas communication between segments of the annular space is provided by ports (not shown), formed in the bulkhead 780.

The auxiliary pipe 774 may be a gas lift line, for example, or may convey sensors. Alternatively, or in addition, the pipe-in-pipe flowline may carry water for supplementary heating of the flowline, as described in application U.S. Prov 60/385243 [63981US] mentioned above.

Figure 5:
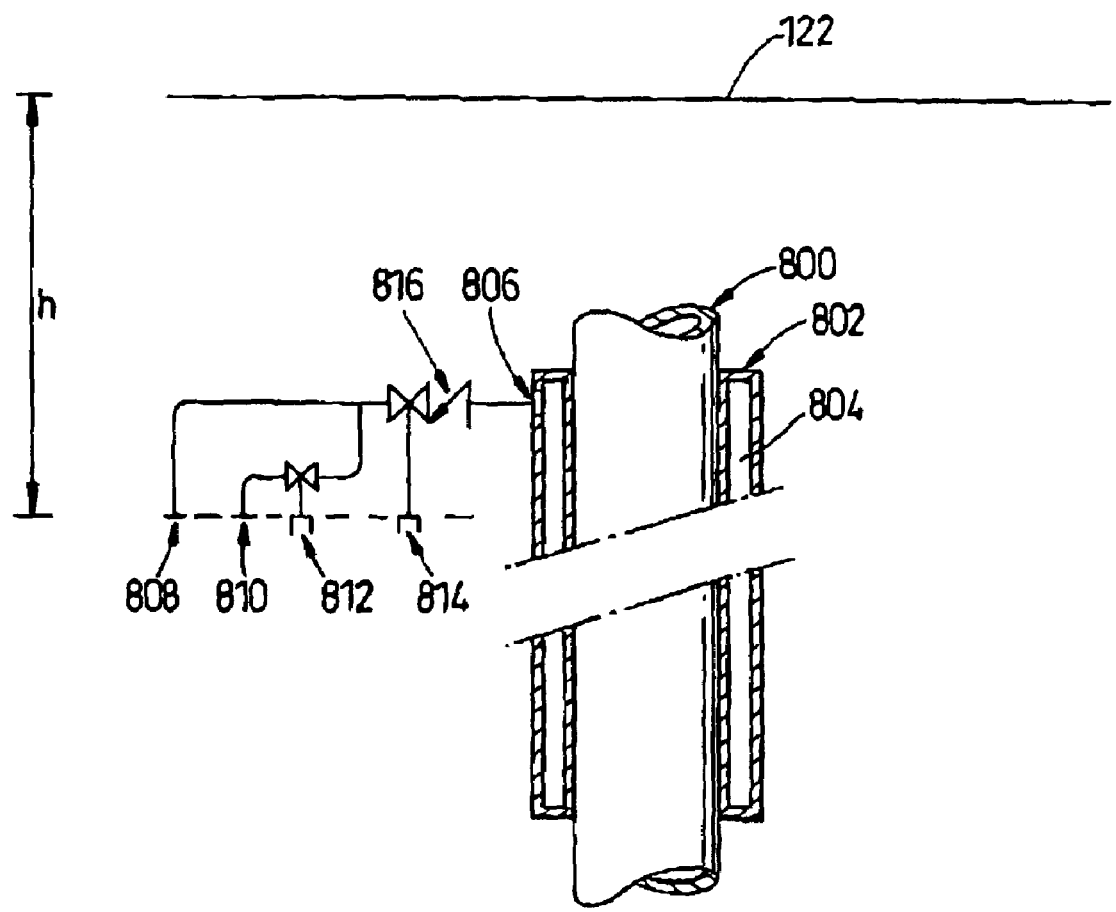
FIG. 5 shows schematically the arrangement of as ports for regulating the pressure in the annulus of the pipe-in-pipe flowline.

FIG. 5 shows schematically the fluid (gas) connections around the upper end of the pipe-in-pipe riser flowline in an ROV-operated example. Diver operation or full remote control is also possible. This end of the pipe is located conveniently at the buoyancy tank (124, FIG. 1), a depth h beneath the sea surface 122, although other locations are possible. The inner pipe is shown at 800, while the outer pipe and end closures are shown at 802, with the space referred to as "the annulus" shown at 804. The space may contain foam, in addition to gas, as desired. A port 806 is provided which connects annulus 804 to an ROV pressure relief connection 808. A pressure gauge connection 810 is provided for monitoring the gas pressure, with pressure gauge barrier valve operable by the ROV at 812.

An annulus pressure control valve 814 is operable by the ROV to connect the annulus to allow gas to flow from the annulus to the outside via connection 808. A check valve 816 is included to prevent ingress of water to the annulus. Valve 814 may be of double block type. Check valve 816 may have an override facility for pressurising the annulus with gas.

Figure 6:
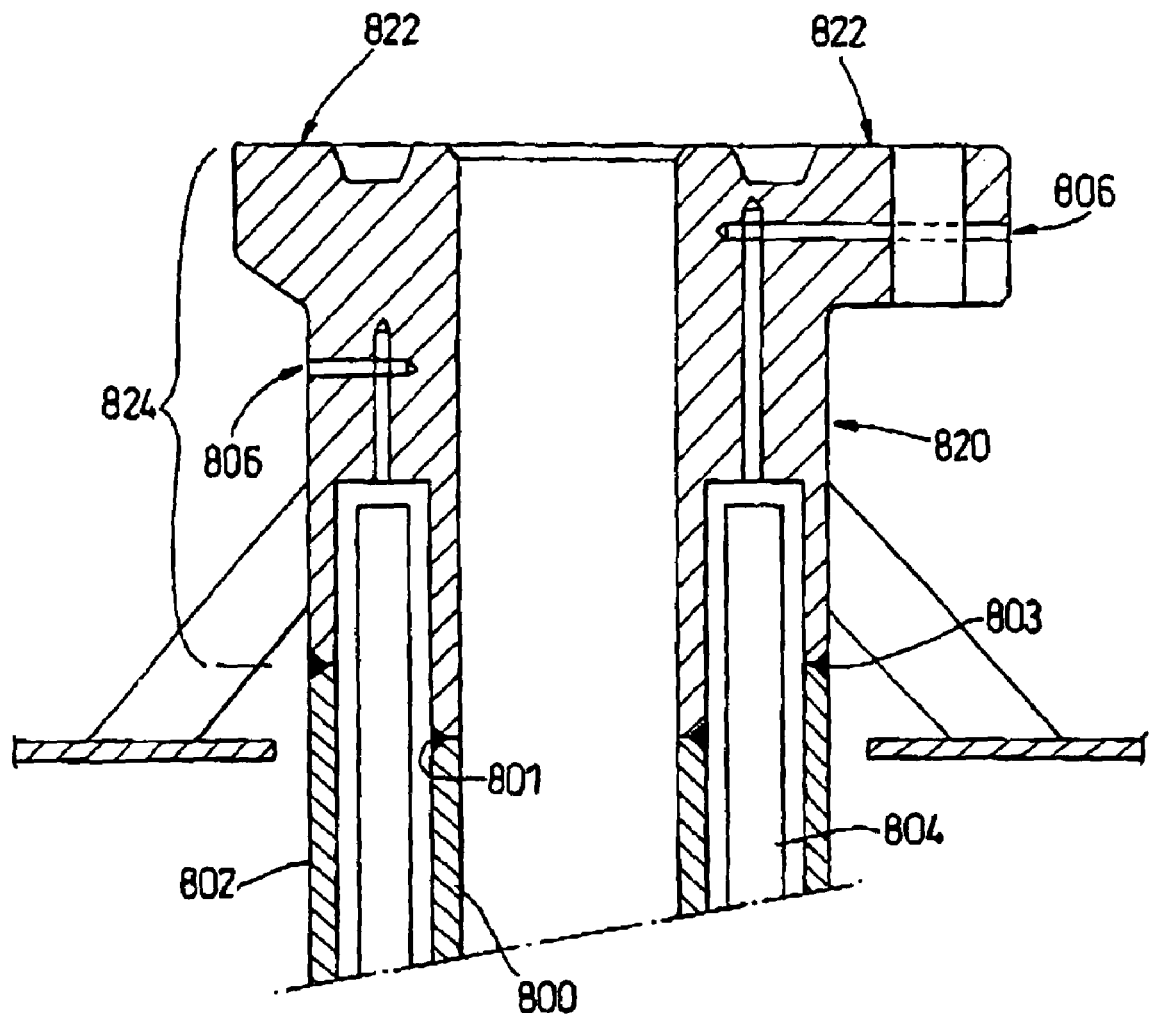
FIG. 6 shows in cut-away detail the port arrangement at the bead of the riser tower

FIG. 6 shows in greater detail one possible structure for the top end connection and annulus access ports inner and outer pipes 800, 802 are welded at 801 and 803 respectively to a specialty formed termination unit 820, supported on the buoyancy tank top structure. Production fluid connection is made to the main flange surface 822, while annulus access ports 806 are connected through bores in the termination unit 820 as shown. The area shown generally as 824 is thermally protected by a "dog house" structure after connection of the "gooseneck" and flexible jumper. These parts are conventional, and omitted for clarity.

In operation, the annulus is initially filled with pressurised gas. The initial pressure is above the critical pressure, giving a relatively high initial OHTC. This allows the production of fluid from a well having a particularly high temperature which, without substantial heat transfer to the ambient seawater, would cause problems at the surface. At a late date, when production fluids are of a lower temperature or otherwise different in character, the OHTC can be adjusted to decrease thermal transfer can be done merely by releasing the gas under its own pressure by Operation of the valve 814.

The pressure can be maintained at all times above the surrounding seawater pressure, avoiding seawater ingress detrimental to insulating material properties Gas can be suitably selected to meet project specific requirements. Happily, calculations show that cheap and relatively inert gases such as Carbon Dioxide and Nitrogen are likely to be suitable for the range of temperatures and pressures experienced by deepwater hybrid riser tower bundles. Of course, a mixture of gases can be used for further control or convenience.

The process can be made reversible, if in the later stages of the field it is necessary to revert to the previous OHTC. With suitable conduits, couplings and compressors, the Pipe-in-Pipe annulus may be again pressurised while in place. For the period when a higher OHTC is required the pressure can be set above the critical pressure. When the lower OHTC is required the pressure can be released to a pressure close to the seawater pressure (about 6 to 8 bar), which is well below the critical pressure of both gases.

FIG. 7 illustrates a stepped tower construction, compatible with any of the examples of FIGS. 2 to 6. Thanks to the insulation on the flowlines themselves, the foam blocks F need not extend the full length of the tower. In this example the foam buoyancy material is provided in discrete sections spaced apart along the length of the riser tower. Advantages of the stepped tower include reduced cost, and controllable buoyancy. Another advantage of varying the cross-section along the length of the tower is a reduced tendency to vortex-induced vibration, under the influence of water currents. In embodiments where some of the warmer lines are outside the core, individual or group insulation of the lines is of course necessary, at least in the sections between the foam blocks, as in the co-pending application mentioned above.

The skilled person will recognise that the above examples are intended for illustration only, and many variations are possible without departing from the spirit and scope of the invention.

The invention claimed is:

1. A method of conveying fluid through a sub-sea conduit having inner and outer walls and a gas-permeable space between the walls providing thermal insulation, the method comprising varying the heat transfer properties of the conduit after a period of operation to provide different levels of insulation for the conveyed fluid in different periods of operation, by varying the pressure of a gas within the space between values above and below a critical pressure of the gas, at which thermal conductivity of the gas exhibits a high rate of change.

2. A method as claimed in claim 1, wherein said space is pressurised above the critical pressure, and then the pressure is released to achieve a lower thermal conductivity through the gas.

3. A method as claimed in any one of claims 1 or 2, wherein the pressure change is made in the reverse direction, and repeated as necessary.

4. A method as claimed in any one of claims 1 or 2, wherein the conduit forms part of a riser for carrying flowlines from the seabed to a surface installation.

5. A method as claimed in any of claims 1 or 2, wherein the conduit terminates at a submerged buoyant support, as in a hybrid riser tower.

6. A method as claimed in claim 5, wherein a port for passage of said gas is provided at the location of the submerged buoyant support.

7. A method as claimed in claim 6, wherein the pressure within said space remains equal to or greater than the ambient pressure at the port.

8. A method as claimed in any one of claims 1 or 2, wherein one or more valves are used for controlling the flow of said gas from the space.

9. A method as claimed in claim 8, wherein one or more of said valves are adapted for operation by remotely operated vehicle (ROV).

10. A method as claimed in any one of claims 1 or 2, wherein a gas inlet connection is provided for use in increasing the gas pressure.

11. A method as claimed in any one of claims 1 or 2, wherein one-way check valves are provided for preventing unintentional ingress of seawater in the event of pressure loss.

12. A method as claimed in claim 1 wherein the fluid to be conveyed is a hydrocarbon fluid warmer than the undersea environment, the thermal insulation serving to keep heat in the fluid.

* * * * *